F. J. RAYFIELD.
CHAIN TIGHTENER.
APPLICATION FILED FEB. 16, 1918.
1,373,386.
Patented Mar. 29, 1921.
2 SHEETS—SHEET 1.
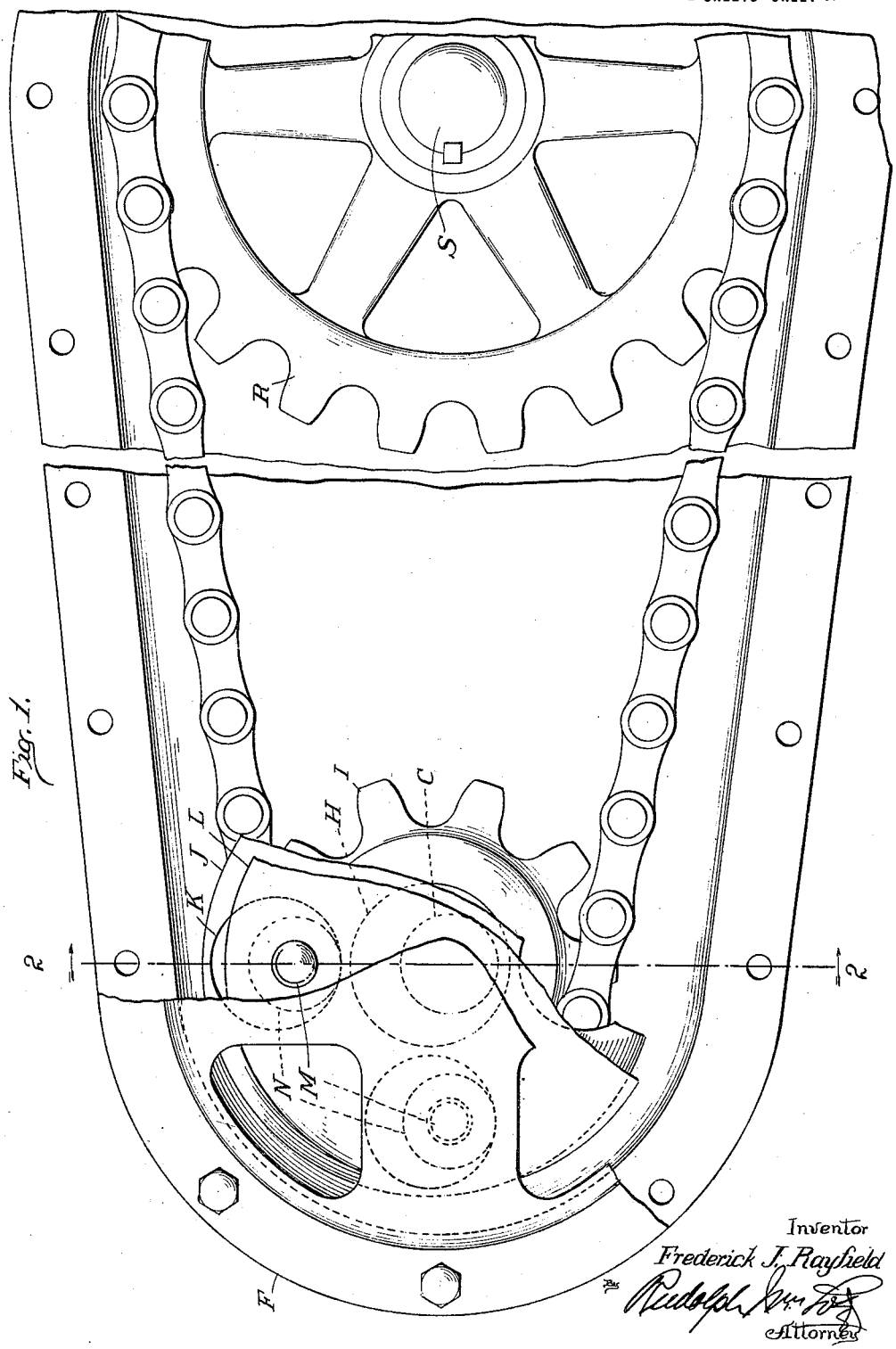

F. J. RAYFIELD.
CHAIN TIGHTENER.
APPLICATION FILED FEB. 16, 1918.
1,373,386.
Patented Mar. 29, 1921.
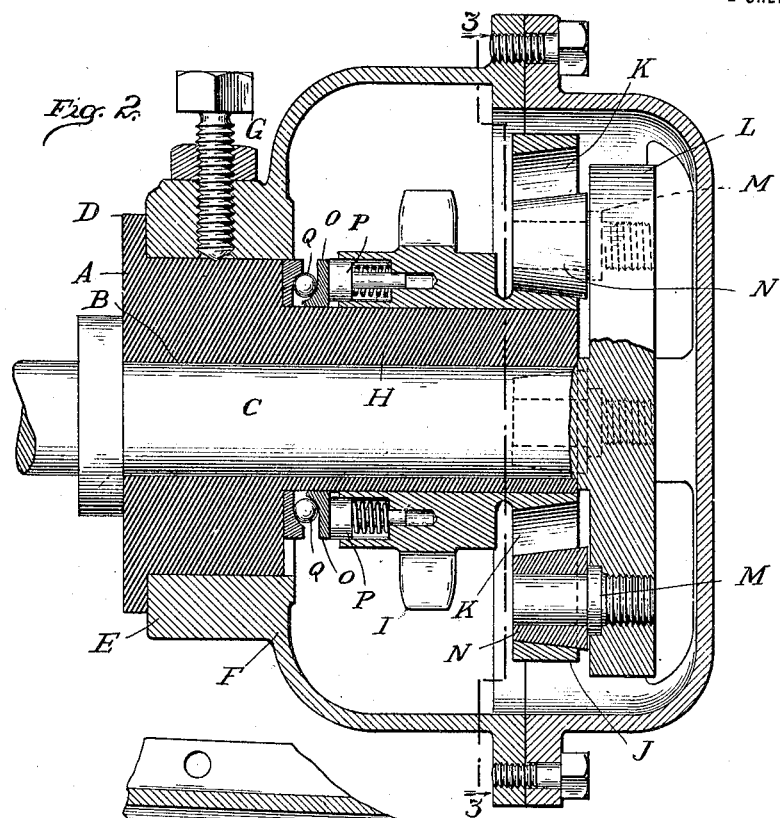
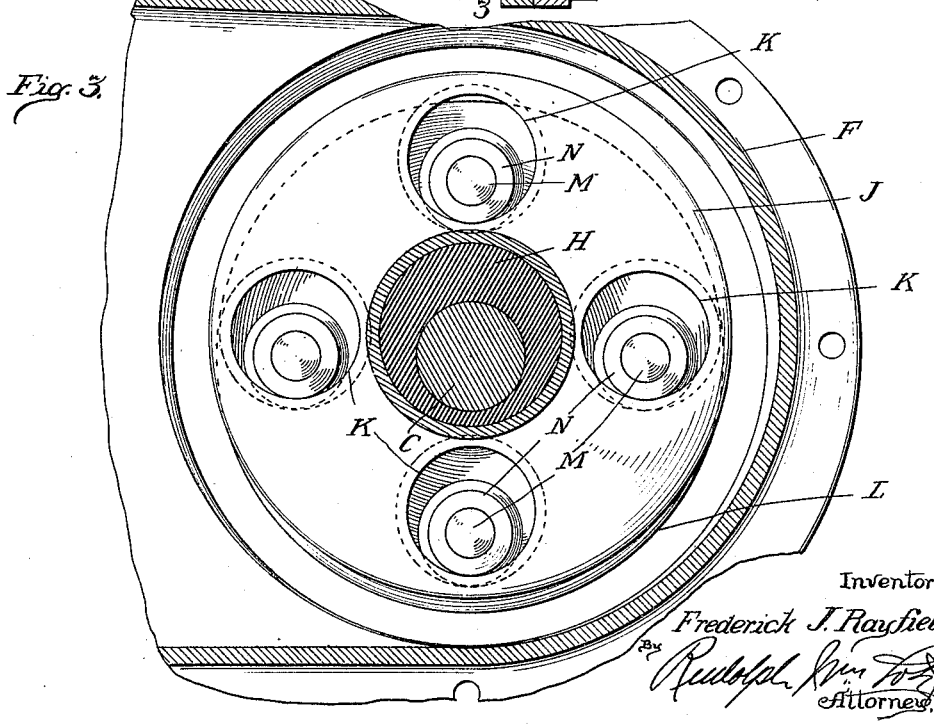
Inventor
Frederick J. Rayfield

UNITED STATES PATENT OFFICE.

FREDERICK J. RAYFIELD, OF CHICAGO, ILLINOIS.

CHAIN-TIGHTENER.

1,373,386.　　　　　Specification of Letters Patent.　　Patented Mar. 29, 1921.

Application filed February 16, 1918. Serial No. 217,538.

*To all whom it may concern:*

Be it known that I, FREDERICK J. RAYFIELD, citizen of the United States, residing at Chicago, in the county of Cook and State of Illinois, have invented certain new and useful Improvements in Chain-Tighteners; and I do hereby declare the following to be a full, clear, and exact description of the invention, such as will enable others skilled in the art to which it appertains to make and use the same.

This invention has for its object to provide a simple, durable and novel sprocket chain tightener particularly adapted for automobile and similar high-speed sprocket chain transmission gears as well as in other classes of machinery.

A further object of the invention is to provide a chain-tightener of the character set forth in which wear between the sprocket carrying element and the driving or driven element associated therewith is automatically taken up and lost motion between these parts is obviated as is also the noise resulting therefrom.

Another object of the invention is to provide means for transmitting rotary motion directly to or from a sprocket and an associated member disposed eccentrically with relation thereto without the interposition of coupling means, whereby friction and the number of wearing surfaces is reduced to a minimum.

A suitable embodiment of the invention is illustrated in the accompanying drawings in which:

Figure —1— is a fragmentary transverse section of a sprocket chain drive constructed in accordance with my invention.

Fig. —2— is a detail section on the line 2—2 of Fig. —1—.

Fig. —3— is a detail section on the line 3—3 of Fig. —2—.

Referring now to said drawings A indicates a bushing of bronze or other suitable metal having a central bore B constituting a bearing of a shaft C. The said bushing is provided at one end with an annular flange D, the inner face of which abuts against the hub portion E of a gear-casing F which is maintained rigid with said bushing by means of a set-screw G, said casing being also rigid with the frame of the automobile, or machine of which it forms a part. The bushing may be rotated relatively to the gear-casing F by loosening the set screw G.

At its other end said bushing A terminates in an eccentric sleeve H through which the bore B extends and on which the sprocket I is rotatably mounted, said sprocket being geared to a companion sprocket R on a shaft S parallel with the shaft C by means of a sprocket chain.

Rigid and preferably integral with said sprocket is a disk or annular flange J having a plurality of equally spaced equal openings K therethrough, all of which are equidistant from the axis of the sprocket I. Each of said openings K is tapered slightly.

Mounted on the shaft C is a disk L from the face of which opposing the disk or flange J there project a number of studs M equal to the number of openings K and similarly spaced. Mounted on each of the studs M is a tapered anti-friction roller N, the mean diameter of which is as much shorter than the mean diameter of the opening K receiving the same as the distance separating the axes of the shaft C and sprocket I. Each of the rollers N is of greater length than the thickness of the disk or flange J so that as the contacting surfaces of the openings K and rollers N wear the latter may project farther into said openings to automatically take up such wear. This may be automatically effected by means of the ring O mounted between the shoulder at the inner end of the body portion A of the bushing and the opposed face of the sprocket I. The radius of said ring O is slightly greater than the greatest radial distance from the axis of the shaft C to the circumferential face of the sleeve H and is maintained concentric with the sprocket I by means of the dowel pins P projecting from one face of said ring and entering dowel openings in the opposed end of said sprocket. Compression springs interposed between the opposing faces of said ring O and sprocket I, and through which the dowel pins P extend serve to exert a separating force on said parts whereby the sprocket I and disk or flange J are forced toward the disk L on the shaft C. This separating force is preferably as light as is consistent with prevention of ready relative movement of said parts against the action of said springs under the influence of the stress or strain transmitted from one to the other of said parts in operation. To lessen friction between the ring and the shoulder against which it bears, said parts may be provided with race-ways for the balls Q.

The distance separating the axes of the shaft C and sprocket I is preferably one-half the length of a link in the sprocket chain trained over said sprocket.

When the chain is first trained over the sprocket I and its companion sprocket, the bushing A is so positioned as to throw the axis of the sprocket I into the plane intersecting the axis of the shaft C and that of the companion sprocket and so that it will be between the last-named axes. As the sprocket chain wears the bushing A will be gradually rotated about its axis and readjusted in position with respect to the gear casing or equivalent rigid part of the machine to increase the distance between the axis of the sprocket I and its companion sprocket to take up the wear in the chain. When the bushing A has thus been rotated through an arc of one-hundred eighty degrees a link will be taken out of the chain and the bushing A returned to its primary position.

While I have illustrated the preferred embodiment of the invention in the accompanying drawings, it will be understood, of course, that the relative positions of certain parts may be reversed and other equivalent modification and changes effected without departing from the invention as defined in the appended claims.

It will also be obvious that my said device is equally well adapted to tightening transmission belts of all kinds.

I claim as my invention:

1. A chain tightener comprising a bearing member having a bore eccentric to its circumferential face, a shaft journaled in said bore, a sprocket rotatably mounted on said member, a pair of disks rigid respectively with said sprocket and said shaft spaced from each other and equipped with male and female inter-engaging elements for transmitting rotation from one to the other thereof, and means for maintaining said bushing adjustably rigid with the frame of the machine, said interengaging elements comprising a plurality of tapered anti-friction rollers projecting from the face of one of said disks into tapered openings in the other thereof, the relative diameters of said rollers and openings being varied to accord with the space separating the axes of the shaft and sprocket.

2. A chain tightener comprising a bearing member having a bore eccentric to its circumferential face, a shaft journaled in said bore, a sprocket rotatably mounted on said member, a pair of disks rigid respectively with said sprocket and said shaft and equipped with male and female inter-engaging elements for transmitting rotation from one to the other thereof, and means for maintaining said bushing adjustably rigid with the frame of the machine, said interengaging elements comprising a plurality of tapered anti-friction rollers projecting from the face of one of said disks into tapered openings in the other thereof, the relative diameters of said rollers and openings being varied to accord with the space separating the axes of the shaft and sprocket, and a means associated with said disks for imparting relatively opposite movement thereto in the direction of their axes for maintaining the tapered surfaces of the interengaging elements in contact with each other for automatically taking up wear thereon.

3. A chain tightener comprising an eccentric and a shaft therefor upon which said eccentric rotates, a sprocket rotatably mounted on the eccentric, elements rigidly connected with the sprocket and shaft, one of said elements provided with tapered openings and the other with tapered rollers of smaller diameter entering said openings, and means for urging the elements toward each other.

4. A chain tightener comprising a shaft, an eccentric rotatably mounted on the shaft, a sprocket wheel rotatably mounted on said eccentric, a flange formed on the sprocket and provided with tapered openings, a disk secured to the shaft and spaced from the flange on the sprocket, tapered rollers carried by the disk and extending into the tapered openings of the flange, and means for urging the sprocket and associated flange, toward the disk.

5. A chain tightener comprising a shaft, an eccentric rotatably mounted on the shaft, a sprocket wheel rotatably mounted on said eccentric and having openings on one face thereof, a flange formed on the opposite face of the sprocket and provided with tapered openings, a disk secured to the shaft and spaced from the flange on the sprocket, tapered rollers carried by the disk and extending into the tapered openings of the flange, a ring mounted on the eccentric, pins secured to the ring and extending into the openings in the face of the sprocket wheel, and springs carried in the openings in the sprocket wheel and surrounding the pins for forcing the sprocket wheel and associated flange toward the disk.

6. A chain tightener comprising an eccentric and a shaft therefor upon which said eccentric rotates, a sprocket rotatably mounted on the eccentric, elements rigidly connected with the sprocket and the shaft, one of said elements having circular tapered openings and the other carrying tapered circular projections of smaller diameter, and means for urging the elements toward each other.

FREDERICK J. RAYFIELD.